US006604837B2

(12) United States Patent
Sandberg

(10) Patent No.: US 6,604,837 B2
(45) Date of Patent: Aug. 12, 2003

(54) DEVICE FOR HOLDING A LIGHT SOURCE

(76) Inventor: Robert J. Sandberg, 246 Grant Dr., Sarasota, FL (US) 34236-2029

( * ) Notice: Subject to any disclaimer, the term of this patent is extended or adjusted under 35 U.S.C. 154(b) by 12 days.

(21) Appl. No.: 09/921,499

(22) Filed: Aug. 3, 2001

(65) Prior Publication Data

US 2003/0026093 A1 Feb. 6, 2003

(51) Int. Cl.[7] .............................. F21L 4/00; H04M 1/22

(52) U.S. Cl. ....................... 362/191; 362/105; 362/106; 362/190; 362/282; 362/196; 362/396; 362/208

(58) Field of Search ................................ 362/103, 105, 362/106, 191, 282.1, 196, 194, 190, 396, 208; 2/422; 248/229.16, 229.26, 231.81, 914, 214, 314

(56) References Cited

U.S. PATENT DOCUMENTS

| | | | | | |
|---|---|---|---|---|---|
| 539,799 | A | * | 5/1895 | Dickson | 362/475 |
| 994,094 | A | * | 5/1911 | Eaton | 362/105 |
| 2,258,263 | A | | 10/1941 | Rothenberg | 240/10.66 |
| 2,312,305 | A | | 3/1943 | Berlinger | 240/10.68 |
| 3,067,322 | A | | 12/1962 | Sala | 240/6.4 |
| 3,599,918 | A | * | 8/1971 | Patchett | 248/85 |
| 3,780,209 | A | * | 12/1973 | Schuplin | 174/51 |
| 4,406,040 | A | | 9/1983 | Cannone | 24/3 |
| 4,577,347 | A | * | 3/1986 | Connon | 2/6 |
| 4,967,323 | A | | 10/1990 | Johnson et al. | 362/103 |
| 4,970,631 | A | | 11/1990 | Marshall | 362/105 |
| 4,974,128 | A | * | 11/1990 | Prickett | 362/145 |
| 5,103,384 | A | | 4/1992 | Drohan | 362/191 |
| 5,249,108 | A | * | 9/1993 | Gary | 362/388 |
| D354,677 | S | | 1/1995 | Troyer | D8/369 |
| 5,460,346 | A | | 10/1995 | Hirsch | 248/229.13 |
| 5,467,992 | A | | 11/1995 | Harkness | 273/187.2 |
| 5,541,816 | A | | 7/1996 | Miserendino | 362/106 |
| 5,667,292 | A | | 9/1997 | Sabalvaro, Jr. | 362/106 |
| 5,816,684 | A | | 10/1998 | Yu | 362/191 |
| 6,056,413 | A | | 5/2000 | Urso | 362/106 |
| 6,206,543 | B1 | * | 3/2001 | Henry | 362/191 |
| 6,250,769 | B1 | * | 6/2001 | Kirk | 362/106 |

* cited by examiner

*Primary Examiner*—Stephen Husar
*Assistant Examiner*—Sharon Payne
(74) *Attorney, Agent, or Firm*—Pettis & Van Royen, P.A.

(57) ABSTRACT

A device for holding a light emitting source, including flashlights having incandescent bulbs or light emitting diodes (L.E.D.s), to provide a hands-free light source. The device comprises a clip that is configured for attachment to a support and a member that is attached thereto and extends outwardly therefrom. The member has a hole therethrough that is sized and configured to receive a portion of a light source therein. Many light sources are comprised of at least two parts, that are attachable to one another. A portion of one of the parts is receivable through the hole in the member and is attached to the other one of the two parts, thereby attaching the light source to the member. The clip is then attached to a support to provide a hands free light source.

4 Claims, 4 Drawing Sheets

DEVICE FOR HOLDING A LIGHT SOURCE

BACKGROUND OF THE INVENTION

1. Field of the Invention

The present invention relates to a device for holding a light emitting source, more particularly flashlights, having incandescent bulbs or light emitting diodes (L.E.D.). The device may be attached to any suitable support; however, it is particularly suitable for attachment to hats and other clothing to provide a hands-free light source.

2. Description of the Prior Art

Focusing light on a dark work area has long been a problem, particularly those areas that are located away from a power source or shielded from normal lighting. The use of handheld battery operated portable lighting systems solved the problem of providing supplemental lighting and light without electrical support. However, handheld lighting is inconvenient when there is work to be accomplished by the user's hands. One of the most well-known solutions was implemented by the mining industry when they constructed hats with light sources attached. Placing the light on the user's head close to his/her eyes directs the light to the areas to which the user's eyes are directed. The early candles were subsequently replaced by high-powered lights that focused the light on the work area using reflectors. The medical field, particularly surgeons, frequently wear powerful light sources on their head to supplement available light and to focus light on a the specific area of the patient being operated on, while leaving the surgeon's hands free to perform surgery.

A number of patents have been issued for devices similar to the miner's hats, including U.S. Pat. No. 4,406,040, U.S. Pat. No. 5,541,816, U.S. Pat. No. 5,667,292 and U.S. Pat. No. 6,056,413. Each of these devices provides means for attaching a light source to a hat. These devices are relatively complex or require a light source to be constructed specially to be a part of that device.

Four other patents illustrate devices for attaching light sources to other portions of clothing, including attachment to shoes: U.S. Pat. No. 3,067,322, U.S. Pat. No. Des. 354,677, U.S. Pat. No. 4,967,323 and U.S. Pat. No. 5,460,346. A fifth patent, U.S. Pat. No. 4,970,631, discloses a method for attaching a flashlight to a headband.

Most of the aforementioned devices are complex and expensive to make or provide weak support for the light source. Many require a specialized light source that is usable only for this purpose. Therefore, notwithstanding the existence of these prior art patents, there is a need for device to hold a light source that is very inexpensive to make and easy to use, and which is capable of using an existing light source.

SUMMARY OF THE INVENTION

The present invention relates to a device holding a light emitting source, particularly a device that is easy to attach to an existing light source. Most simply stated, the device of this invention comprises a clip that is configured for attachment to a support and a member that is attached thereto and extends outwardly therefrom. The member has a hole through it that is sized and configured to receive a portion of a light source. Many standard light sources are comprised of at least two parts that are attachable to one another. The hole in the member is sized so that a portion of one of the parts is receivable by the hole and then is attached to the other one of the two parts sandwiching the member between the light source parts. In this way, a light source is attachable to and held by the member and thus by the device.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF A PREFERRED EMBODIMENT

Figure 1:
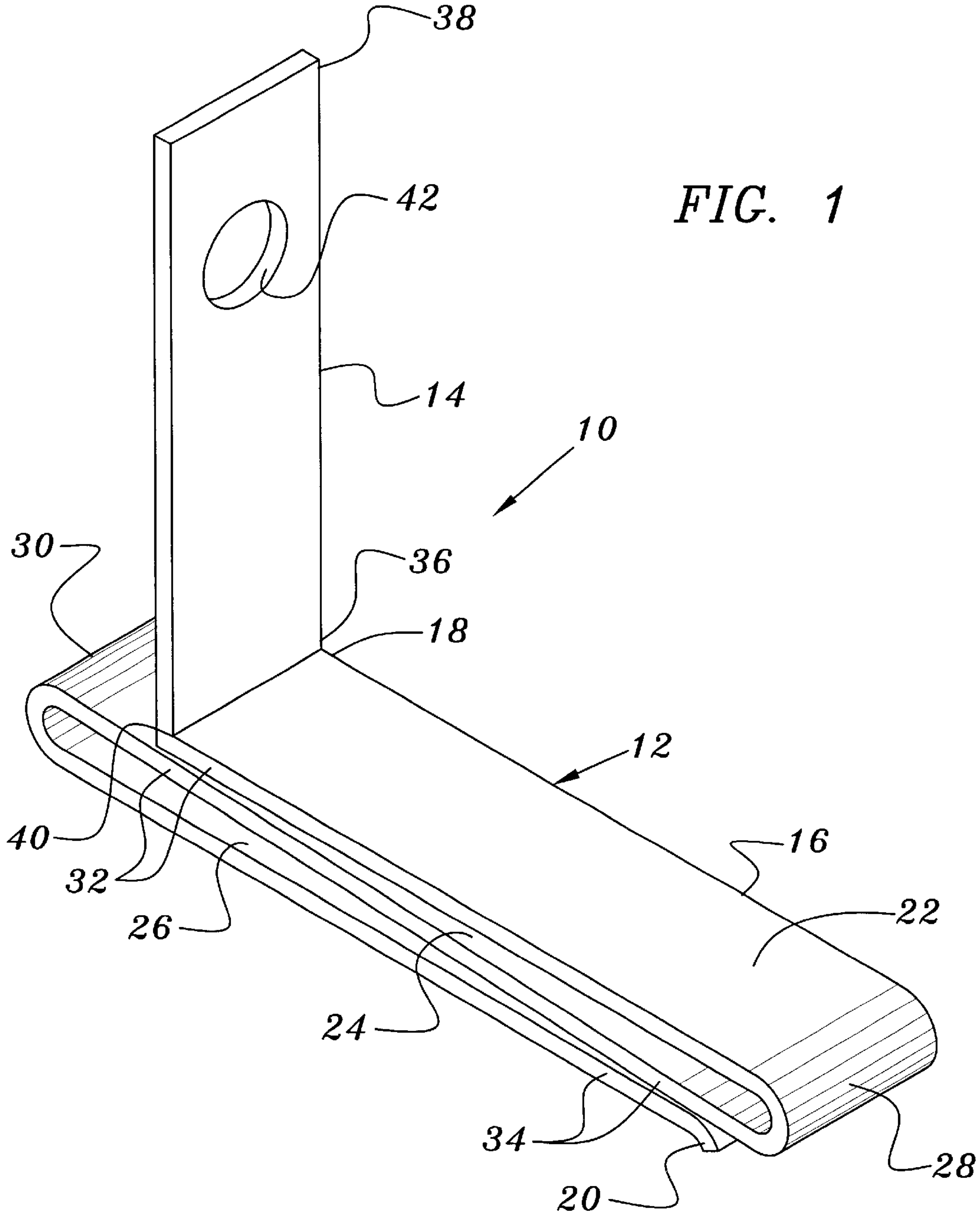
FIG. 1 is an isometric view of the clip and the member of this invention.
Figure 8:
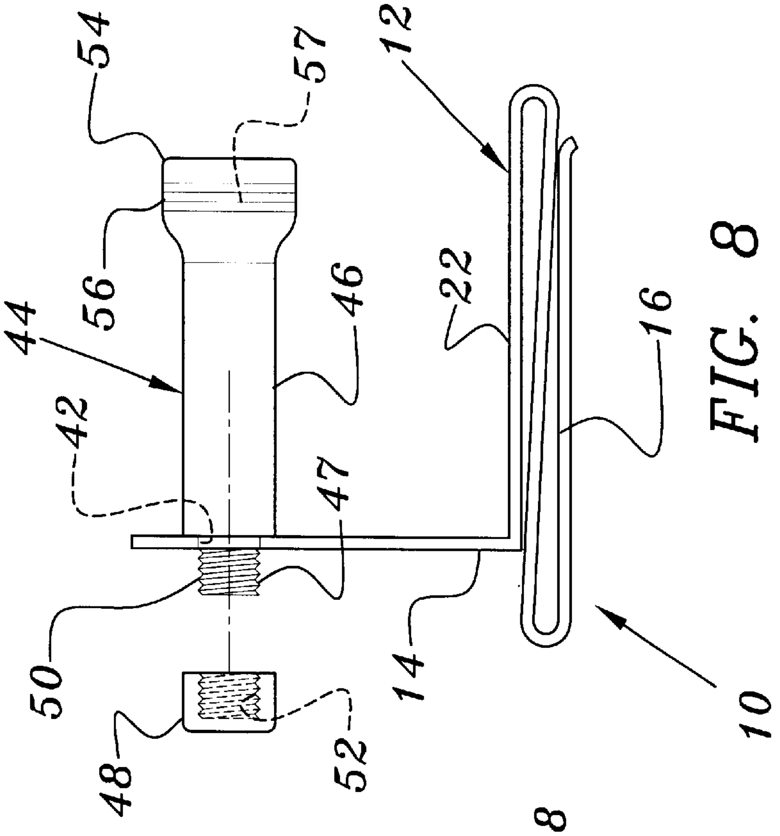
FIG. 8 is a right side elevational view of the device of FIG. 1 with the light source attached.
Figure 9:
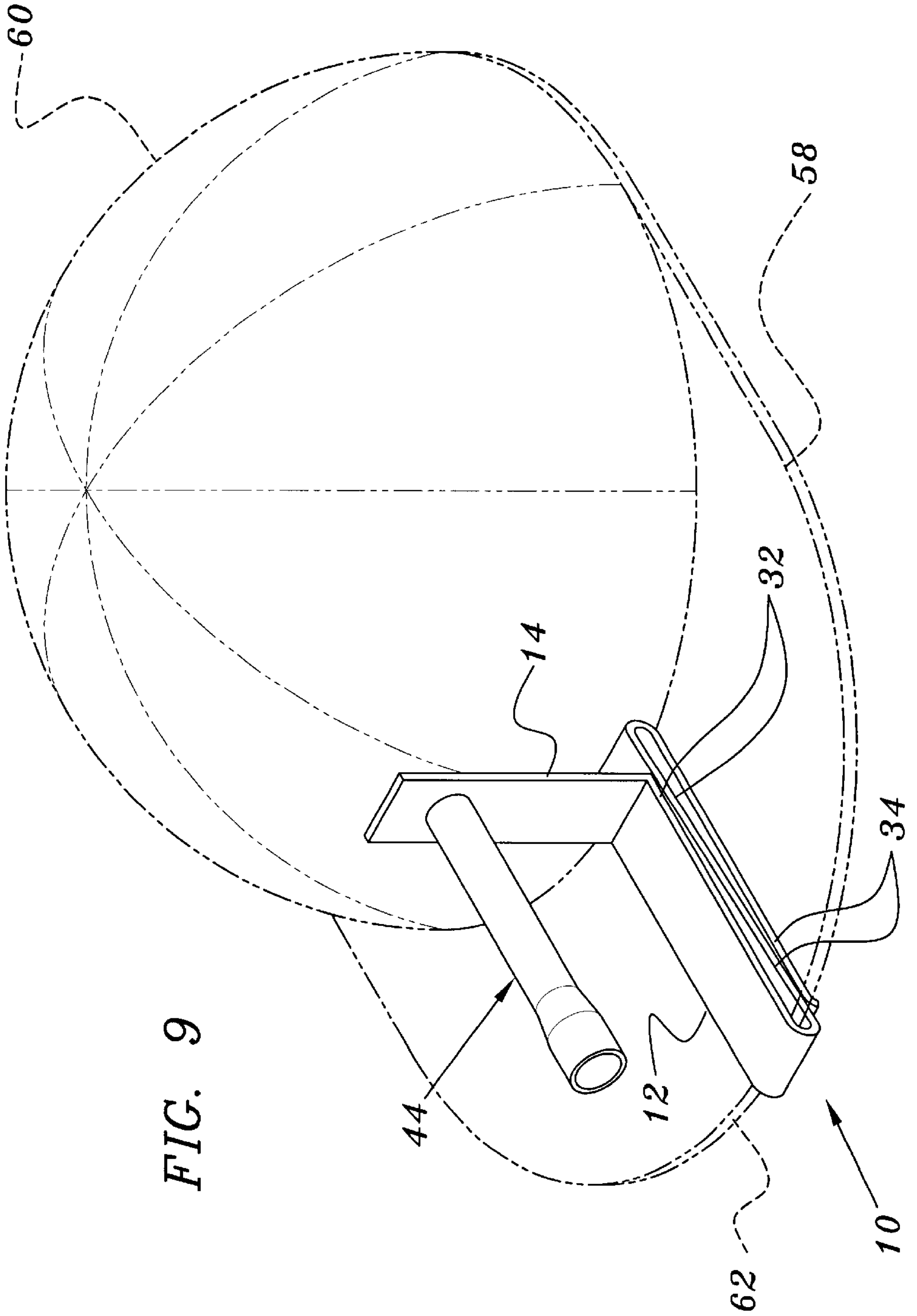
FIG. 9 is an isometric view illustrating the attachment of device of FIG. 8 illustrating the attachment of the device to a cap.

A preferred embodiment of this invention, a device holding a light source, is illustrated in the drawing FIGS. 1–9 in which the device is generally indicated as 10 in FIGS. 8 and 9. Referring first to FIG. 1, it can be seen that the device 10 comprises a clip shown generally as 12 and a member 14 that is attached to the clip 12.

The clip 12 in a preferred embodiment, as illustrated in FIG. 1, is configured for attachment to a support that is generally structurally thin, including, hats, other articles of clothing and pieces of metal, wood or other convenient supports located near the area to be illuminated. The clip 12 is formed from a longitudinally extending plate 16 that is relatively narrow when compared with its total length and has a first end 18 and a second end 20. The width and length of the plate 16 must be adequate to maintain the stability of a light source when it is received by the device 10. The more flexible the material from which the support is made, the wider the plate 16 must be to maintain stability. The plate 16 has a first section 22, a second section 24, and a third section 26, which are separated from one another by bends in the plate 16. The first section 22 is separated from the second section 24 by a first bend 28 and the second section 24 is separated from the third section 26 by a second bend 30. The bend 28 is formed in the plate 16 so that the first section 22 overlies and is proximal to the second section 24. The bend 30 is formed in the plate 16 so that the second section 24 overlies and is proximal to the third section 26. The second end 20 of the plate 16 is curved away from the second section 24 so that a support may easily be received between the second section 24 and the third section 26 of the clip 12. The plate 16 is made from generally resilient material, such as spring steel, so that the first section 22 and the second section 24 are biased toward one another, forming a first pair of jaws 32 and the second section and the third section 26 are biased toward one another forming a second pair of jaws 34. The bends 28 and 30, that are formed into the plate, have formed the plate into a generally flat S-shape.

In other preferred embodiments, the clip may be sized for attachment to thicker supports. This is accomplished by enlarging the radius of the bends 28 and 30 so that the sections 22, 24, and 26 are spaced further apart from one another, but are still biased toward one another.

Figures 2, 3, 4, 5, 6:
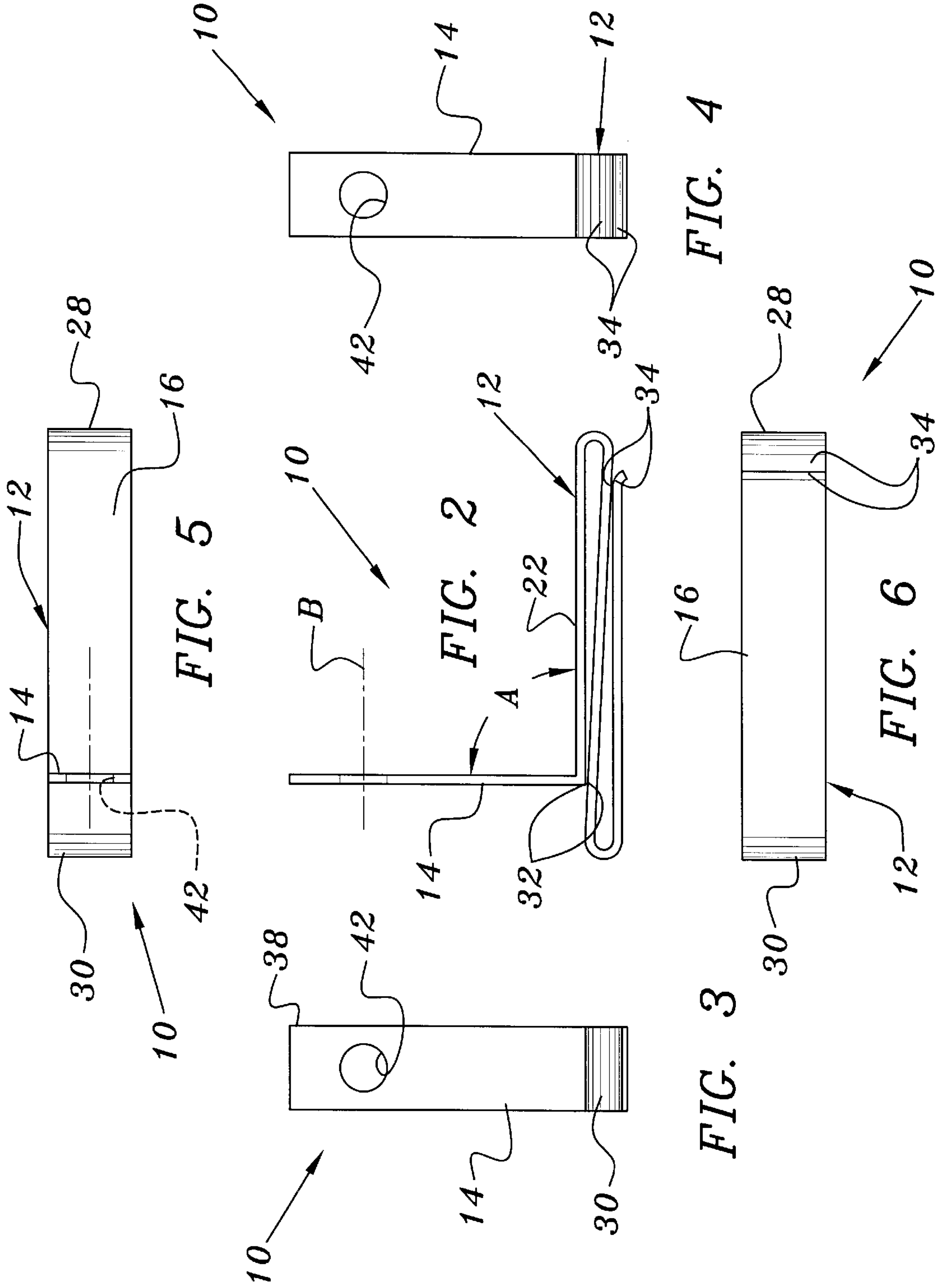
FIG. 2 is a left side elevational view of the device of FIG. 1.
FIG. 3 is a rear view of the device of FIG. 1.
FIG. 4 is a front elevational view of the device of FIG. 1.
FIG. 5 is a top plan view of the device of FIG. 1.
FIG. 6 is a bottom plan view of the device of FIG. 1.
Figure 7:
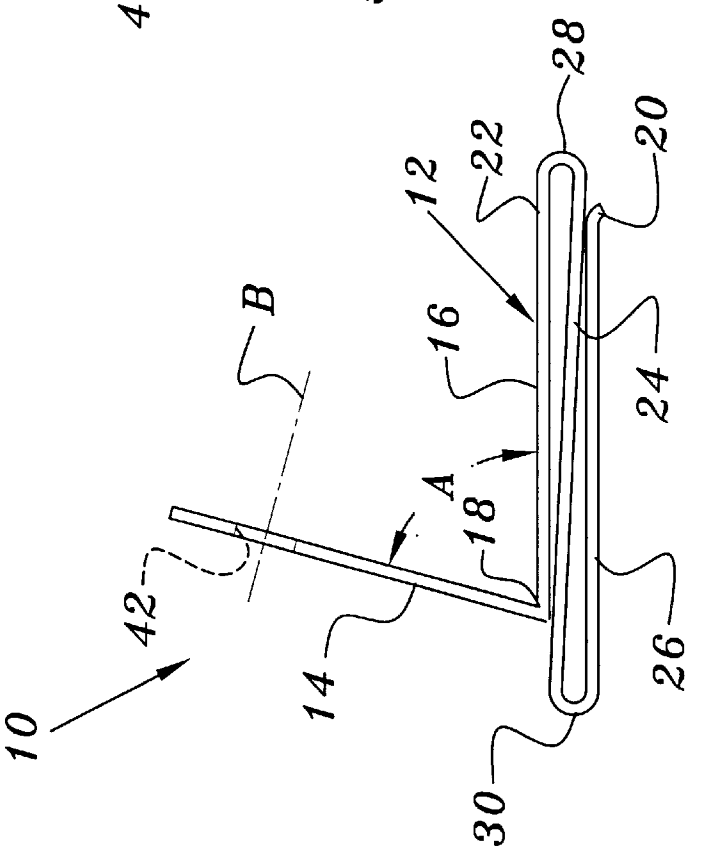
FIG. 7 is a right side elevational view of the device of FIG. 1 illustrating the member angled forward.

The member 14 has a first end 36 that is attached to the first section 22 of the clip 12 and a second end 38 that extends outwardly in relation to the clip 12. In a preferred embodiment, the member 14 is a unified part of the longitudinal plate 16. That is, the member 14 is an extension of the longitudinal plate 16, such that the first end 36 of the member 14 is coincident with the first end 18 of the longitudinal plate 16. To form the member 14, a third bend 40 is formed between the first end 18 of the longitudinal plate 16 and the first end 36 of the member 14. As seen in FIG. 2, the angle A between the member 14 and the first section 22 may be approximately 90 degrees. However, the material from which the device 10 is made is sufficiently flexible so that the member 14 may be bent to any suitable angle with the clip. For example, as shown in FIG. 7, the angle A is illustrated as obtuse, but the angle A could be bent to be greater than 90 degrees as needed. In other preferred embodiments, the member 14 may be attached to the first section 22 anywhere along its length by welding, bolting, or any other well-known means. In this embodiment the third bend 40 would preferably be formed in the member 14 above the point of connection to prevent failure in the weld or any other suitable method of connection.

The member 14 has a hole 42 formed therethrough. In a preferred embodiment, as shown in FIG. 1 and FIG. 3, the hole is formed proximal to the second end 38 of the member 14. The hole 42 is sized and configured so that a portion of a light source may be received through the hole 42. This is possible if the light source is separable into at least two parts, so that one of those two parts may be inserted through the hole 42 and attached to the other one of the two parts, thus attaching the light source to the member 14. For example, as illustrated in FIG. 8 and FIG. 9, such a light source may comprise a mini-flashlight 44 which may use an incandescent bulb or light emitting diodes L.E.D.s, which is used here solely for the purpose of illustration. The mini-flashlight includes a first part, a body 46 that has a first end 47, and a second part, a battery cap 48. In this particular illustration, male threads 50 are formed on the first end 47 of the body 46 and female threads 52 are formed in the interior of the battery cap 48. Thus in a device 10 that is sized to hold a mini flashlight 44, as seen in FIG. 8, the threaded first end 47 of the body 46 is receivable through the hole 42 and the battery cap 48 may then be threadably attached to the body 46. When the battery cap 48 is tightened, the member 14 is trapped between the battery cap 48 and the body 46 and the mini flashlight 44 is thus attached to the member 14 and thus to the device 10. In a preferred embodiment, where the mini-flashlight 44 is separable into two parts between the lens cap 54 and the second end 56 of the body 46, the hole 42 may be sized to receive the second end 56 therethrough. Threads 57 are formed on the second end 56 and extend through the hole 42 so that the lens cap 54 can be threadably mounted to the second end 56 of the body 46, thereby trapping the member 14 therebetween and thus attaching the mini-flashlight 44 to the device 10. In other preferred embodiments, the light source may be separable into two parts that are not threaded, but are snapped together or attached by other well-known means. One of the two parts of these light sources may be receivable through the hole 42 and attached to the other one of the two parts.

As previously discussed, the device 10 is preferably constructed from spring steel. However, the device 10 may be constructed from any suitable resilient resin or other material that is suitable for the purpose and those materials will be readily known by those skilled in the art.

Having thus set forth a preferred construction for the current invention, it is to be remembered that this is but a preferred embodiment. Attention is now invited to a description of the use of the device 10 for holding a light source.

The use of the device 10 will be further illustrated using the mini-flashlight 44 as the light source, as seen in FIG. 8 and FIG. 9. The battery cap 48 is removed from the mini-flashlight 44 and the threaded end 48 of the body 46 is inserted through the hole 42 in the device 10. The battery cap 48 is then threadably attached to the body 46 so that the member 14 is trapped between the battery cap and the body 46 of the mini-flashlight 44. For most uses, the mini-flashlight 44 is mounted to the device 10 so that the mini-flashlight largely overlies the clip 12, as seen in FIG. 9. The clip 12 may then be attached to the bill 58 of a cap 60 by sliding the bill 58 between the jaws 32, thereby attaching the device 10 to the cap 60. The jaws 32 and 34 open in opposite directions. Therefore, if the bill 58 were inserted between the jaws 34 the mini-flashlight 44 would shine toward the cap 60. Of course, if the mini-flashlight was fastened to the device 10 so that it extends outwardly from the clip 12, that is in the opposite direction to that disclosed in FIG. 9, the mini-flashlight 44 would extend outwardly beyond the bill 58 of the cap 60 when the jaws 34 were used to attach the device 10 to the bill 58. In most cases this would place too long a moment arm on the bill 58 of the cap 60 causing the bill 58 to bend downwardly from the weight of the mini-flashlight. However, for attachment to more rigid supports the moment arm would not be a serious problem and use of the jaws 34 may provide a better orientation of the light source. Therefore, there are two directions that a light source may be attached to the member 14 and there are two directions that the clip 12 may be attached to a support by using either jaws 32 or 34. When attaching the device 10, with the mini-flashlight attached as seen in FIG. 9, the jaws 34 may be used to clip the device 10 to clothing so that the mini-flashlight is aimed downwardly and the clip remains firmly attached to the clothing.

Returning to the example of the device 10 being attached to the bill 58 of a cap 60, it can be seen that by attaching the clip to different positions on the bill 58, the light may be angled from the side of the user to reduce shadows, as necessary. In addition, as shown in FIG. 7, member 14 may be bent toward the first section 22 reducing the angle A between the member 14 and the first section 22 and focusing the light downwardly along the center line B. This will permit the user to aim the light toward the specific area in which light is desired.

While the foregoing describes a particularly preferred embodiment of the present invention, it is to be understood that numerous variations and modifications of the structure will occur to those skilled in the art. Accordingly, the foregoing description is to be considered illustrative only of the principles of this invention and is not to be considered limitative thereof, the scope of the invention being determined solely by the claims appended hereto.

What is claimed is:

1. A device for holding a light source comprising:

a clip, comprising a longitudinally extending plate having a first end, a second end, and a longitiudinal axis, said plate having a first section including said first end of said plate; a second section and a third section including said second end of said plate, a first bend being formed in said plate between said first section and said second section such that said first section overlies and is proximal to said second section, said first and second sections being biased toward one another forming a first pair of jaws, a second bend being formed in said plate between said second section and said third section such that said second section overlies and is proximal to said third section, said second and said third section being biased toward one another forming a second pair of jaws, each of said first and second pair of jaws being sized and configured to receive a support therebetween;

a member attached to said first section of said plate of said clip and extending outwardly therefrom, said member having a hole therethrough; and a light source being separable into two parts, such that a portion of one of said two parts is extendible through said hole and is attachable to the other one of said two parts trapping said member therebetween, whereby said light source is attachable to said member.

2. A device for holding a light source as in claim 1, wherein said member is comprised of flexible material such that the angle between said member and said clip may be changed by bending said member.

3. A device for holding a light source comprising:

a clip being configured for attachment to a support;

a member attached to said clip and extending outwardly therefrom, said member having a hole therethrough; and a flashlight being separable into two parts, a threaded barrel and a threaded battery access cap, a portion of said barrel, including threads thereon, is extendible through said hole and is threadably attachable to the threaded portion of said battery access cap, trapping said member therebetween, whereby said flashlight is attachable to said member.

4. A device for holding a light source as in claim 3, wherein said member is comprised of flexible material such that the angle between said member and said clip may be changed by bending said member.

* * * * *